United States Patent Office 3,497,371
Patented Feb. 24, 1970

3,497,371
WATER INSOLUBLE AMINE CONTAINING
BITUMEN EMULSIONS
Irving B. Chang, Morristown, N.J., assignor to Allied
Chemical Corporation, New York, N.Y., a corporation
of New York
No Drawing. Continuation-in-part of application Ser. No.
468,912, July 1, 1965. This application Jan. 4, 1968, Ser.
No. 695,583
Int. Cl. C08h 13/00
U.S. Cl. 106—277                                    8 Claims

ABSTRACT OF THE DISCLOSURE

Active clay type bitumen emulsions containing from 0.1% to 5.0% by weight based on the weight of bitumen of a water insoluble amine afford bituminous coatings having superior water resistance in comparison with coatings prepared from active clay type bitumen emulsions containing no water insoluble amine.

---

This application is a continuation-in-part of my copending application No. 468,912 filed July 1, 1965.

BACKGROUND OF THE INVENTION

This invention relates to active clay containing bitumen emulsions. More particularly, this invention relates to active clay containing bitumen emulsions which are particularly useful in coating applications because of superior water resistance.

A wide variety of materials have been used or proposed to form a protective coating on substrates such as steel, concrete, dirt and wood. Good coatings should be water impervious and resistant to dissolution or chemical attack by materials likely to be spilled on them. Bituminous coatings in particular are widely used because of their low cost, comparatively good resistance to water, chemical and weather resistance, and adhesion to hydrophilic substrates. Coal derived bituminous coatings in particular are frequently used as a protective sealing coat on asphaltic surfaces such as roadways, airport runways and garage areas because of the greater resistance of coal derived bituminous coatings to deterioration by hydrocarbon fuels and lubricants and synthetic ester jet lubricants.

The term "bitumen" as used herein connotes mineral substances naturally occurring or pyrolytically obtained, of a dark brown or black color and consisting essentially of carbon and hydrogen with relatively little oxygen, nitrogen or sulfur. Mineral bitumens are largely carbon disulfide soluble and range in consistency from a highly viscous liquid to solid. Such bitumens include the natural asphalts and asphaltites, the staright-run petroleum by-product obtained by removal of the volatile constituents in crude oil, air-blown and cracked asphalt, and the tars and pitches obtained as by-products in the high or low temperature carbonization of soft coals or lignites.

Virtually all bituminous coating materials are advantageously handled as an aqueous emulsion so as to avoid the health and safety hazards which are involved if the bitumen is thinned with a volatile and usually flammable organic solvent.

The bituminous coating is formed by depositing the emulsion on the substrate to be coated and allowing the aqueous component of the emulsion to evaporate off. This rate of evaporation can, of course, be enhanced by the application of external heat.

The bitumen emulsions with which the instant invention is concerned are of the oil in water type, i.e., the bitumen is the interior phase in the emulsion particle and the water is the continuous phase.

The particular bitumen emulsions with which this invention is expressly concerned are those containing an active clay filler. Active clay fillers connote those clays which have a tendency to stabilize or promote emulsification of the bitumen. The active fillers may be subdivided into "supporting" fillers which tend to coat the bitumen particles and thereby support or stabilize the emulsion, and "emulsifier" fillers which actively aid emulsification of the bitumen rather than merely stabilizing a previously formed emulsion. Examples of supporting type active clay fillers include ball clays, china clays, fire clays and kaolin clays. The emulsifier type active clay fillers are those clays containing at least 40% montmorillonite such as the medium and high grade bentonites.

The bitumen emulsions with which the present invention is concerned may optionally also contain in addition to active clay fillers, other fillers which are inactive in that they do not function as emulsifiers or emulsion stabilizers. Examples of nonactive clay fillers include the high silica clays and the high illite clays. Examples of typical non-clay fillers which are inactive in the sense of not contributing to emulsion formation or stability include asbestos, ground soap stone or lime stone, carbon black, barytes, slate flour and powdered tile.

The active clay type bitumen emulsions with which this invention is concerned are to be distinguished from the soap type bitumen emulsions. In such emulsions an alkali or alkaline earth metal soap of a fatty acid or a fatty acid ester or a mixture thereof is the main emulsifier component, i.e., the main component whose function is to stabilize or aid in emulsification, although a certain amount of clay filler of the type hereinabove defined as active may also be present. Our emulsions contain no strong inorganic base which would reduce the water resistance of the coating.

Active clay type bitumen emulsions are well known to the art and are particularly useful in heavy duty applications such as exterior masonry coatings and road pavement coatings.

The active clay-type bitumen emulsions with which the instant invention is concerned may be prepared by various conventional methods which typically involve the addition with shearing agitation of a molten bitumen/amine mixture to a hot aqueous slurry of the filler. Typical active clay-type bitumen emulsions have a viscosity at room temperature of about 2,000 to 10,000 centipoises, more usually about 3,000 to 7,000 centipoises.

Frequently, such active clay type bitumen emulsions can advantageously be modified by the incorporation therein of a modifying resin to thereby improve certain properties of the coatings produced from the emulsion following evaporation of the aqueous component of the emulsion, as for example, the solvent resistance and extensibility of the coating.

One property in which the active clay containing bitumen coatings have been deficient to a certain extent is water resistance, such deficiency being largely attributable to the hydrophilic nature of the active clay constituent in the coating. Upon immersion in water for an extended time period such active clay containing bitumen coatings will commonly take up as much as 15% water as determined by standard test procedures. Such absorption of water tends to cause a re-emulsification of the system and eventually a breakdown of the coating. The disadvantages attendant to this problem are clearly evident in view of the fact that such coatings are often employed as sealers over highway pavements and the like where durability of the coating is an important factor in safety and maintenance.

SUMMARY OF THE INVENTION

It is an objective of this invention to provide new and improved active clay containing bitumen emulsions. It is a further objective of this invention to provide active clay containing bitumen emulsions having superior water resistance.

Further objects and advantages will become apparent from the description of the invention which follows in greater detail.

It has now been found in accordance with this invention that when 0.1% to 5.0 wt. percent based on bitumen of a water insoluble amine is incorporated into an active clay containing bitumen emulsion, said emulsions afford coatings of superior water resistance in comparison with coatings prepared from active clay containing bitumen emulsions having no amine incorporated therein. In addition to providing coatings of improved water resistance, addition of water insoluble amine improves the elongation and color of the coating.

The term water insoluble amine as used herein connotes an amine having a room temperature solubility in water of no greater than about 5% by weight. Primary, secondary and tertiary aliphatic mono amines are suitable as are aliphatic polyamine compounds. The location of the amino substituent on the aliphatic hydrocarbon chain is not critical and the aliphatic hydrocarbon may optionally contain ethylenic unsaturation. Alicyclic primary, secondary and tertiary amines are also suitable. Additionally, amines containing a mono or polycyclic aromatic nucleus are suitable although it is necessary that at least one amino group in the molecule not be bonded directly to an aromatic nucleus. Preferably the amine has a boiling point at atmospheric pressure of at least about 210° F. Amines having a lower boiling point although equally effective at improving the water resistance of the bitumen coating, are more likely to be at least partially lost by evaporation when the amine is added to the bitumen which bitumen is ordinarily heated to above about 200° F. to ensure homogeneous admixture or when the amine/bitumen mixture is added to the hot aqueous clay slurry.

The structure of the amines which have been found to be suitable may therefore be represented as follows:

$$(RR_1R_2C)_mNH_n$$

wherein $m$ is 1 to 3 and $n$ is 0 to 2, the sum of $m$ and $n$ being 3, and R, $R_1$ and $R_2$, which may be the same or different, denote hydrogen or an aliphatic, alicyclic or aromatic hydrocarbon radical which may optionally have additional amino groups substituent thereon and wherein R, $R_1$ and $R_2$ jointly contain a total of at least 7 carbon atoms and may contain up to 40 carbon atoms. Preferably, R, $R_1$ and $R_2$ jointly contain from 10 to 26 carbon atoms. Most preferably $R_1$ and $R_2$ are hydrogen and R is a straight chain aliphatic hydrocarbon containing 10 to 26 carbon atoms. Examples of suitable amines include those having the following structures:

$$CH_3(CH_2)_x\text{—}NH_2$$

wherein $x$ ranges from 7 to 30;

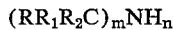

wherein $y$ and $z$ can vary independently from 0 to 10, and wherein the sum of $y$ and $z$ ranges from 8 to 16;

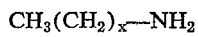

wherein $r$ ranges from 6 to 16 and $s$ ranges from 2 to 10 and wherein the sum of $r$ and $s$ ranges from 10 to 20;

and

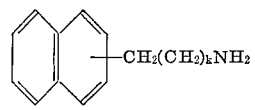

wherein $k$ ranges from 1 to 16;

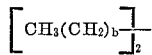

and

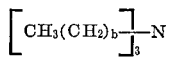

wherein $b$ ranges from 3 to 15;

$$(CH_3)_cN[(CH_2)_dCH_3]_e$$

wherein $c$ and $e$ are 1 or 2, and the sum of $c$ plus $e$ is 3 and wherein $d$ ranges from 4 to 12; and

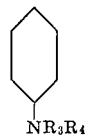

wherein $R_3$ and $R_4$ may be the same or different and may be hydrogen or a $C_1$ to $C_{10}$ normal or branched chain alkyl group and wherein $R_3$ and $R_4$ jointly contain at least 2 carbon atoms.

Amines derived from any of the various di and triterpene acids such as dihydroabietyl amine are also suitable.

Examples of preferred amines include compounds of the structure:

$$CH_3(CH_2)_f\text{—}NH_2$$

wherein $f$ ranges from 9 to 25 such as nonyl amine, capryl amine, lauryl amine, myristyl amine, stearyl amine, eicosyl amine and tricosyl amine and olefinic analogs thereof such as linoleyl and oleyl amine.

This invention is especially applicable to the emulsions produced from the tar and pitch bitumens produced by the carbonization of coal. These bitumens have a softening point ranging from about 50° F. to about 210° F. as determined by the ASTM Ring and Ball Test D–36. Those bitumens having a softening point ranging from about 50° F. to about 110° F. are particularly preferred, and are conventionally designed as RT–6 to RT–12.

As heretofore indicated, the bitumen emulsions with which the instant invention is concerned, contain an active clay type filler which stabilizes or promotes emulsification of the bitumen. Such emulsions may optionally contain other filler or fillers of the types hereinabove enumerated which are inactive with respect to the emulsification of the bitumen. However, at least 40% by weight of the filler should be an active clay filler as hereinabove defined. Preferably at least 60% of the filler is an active clay filler. Although suitable bitumen emulsions can be prepared wherein all the active clay filler is of either the supporting type active clay filler or of the emulsifier type active clay filler, preferably from 1% to 25% of the active clay filler is of the emulsifier type and correspondingly from 99% to 75% is of the supporting type active clay. Most preferably, from 6% to 15% of the active filler is a bentonite emulsifying type active clay filler, and correspondingly from 94% to 85% of the active filler is a ball clay supporting type active clay filler.

The ratio of total filler to bitumen in the emulsion can range from about 1.25 to about 0.3 parts by weight of filler per part of bitumen. The preferred ratio of filler to bitumen is from about 1.0 to about 0.5 part by weight of filler per part of bitumen. The emulsions with which this invention is concerned contain from 35% up to 55% by weight of water and preferably from 40% to 50% by weight of water.

As hitherto indicated, the active clay type bitumen emulsions of the instant invention can be advantageously modified by the incorporation therein of a modifying resin.

The modifying resin added in latex form to the bitumen emulsion may be any of the many natural or synthetic resins which can be formed into or produced in the form of a latex. Examples of such modifying resins include natural rubber, ethylene and propylene polymers and copolymers, chlorinated rubber, chlorinated ethylene and propylene polymers and copolymers, polychloroprene, polybutene, polyisobutylene, polystyrene, butadiene-styrene acrylonitrile terpolymers and butadiene-acrylonitrile copolymers. The preferred modifier resins are the butadiene-acrylonitrile copolymers which have excellent compatibility with the bitumens which are highly effective in improving solvent resistances and extensibility of the films produced therefrom. Such butadiene-acrylonitrile copolymers preferably contain 50–80% butadiene and can readily be produced as a latex suitable for direct addition to the bitumens in accordance with the instant invention.

The amount of the modifying resin added to the bitumen emulsion is generally between about 0.5% to about 15% based on the weight of the bitumen in the emulsion, preferably 1% to 5%. Resin latexes contain typically about 50% of modifying resin solids.

Correspondingly, therefore, the amount of added latex is usually about 1% to 30% based on the bitumen.

The emulsions of the instant invention may be further modified by adding thereto from about 0.5 to 10 lbs. per gallon of emulsion of a chemically inert ingredient such as sand, cork, water glass, mica, and vermiculite or mixtures thereof. Such inert additives are preferably mixed with the emulsion so as to form a slurry and the slurry then promptly applied to the substrate being coated, both to avoid the necessity of shipping inert material which is readily procured locally and also because such ingredients rapidly settle out of the slurry on quiescent standing. For example, a coating formed from a slurry of sand in the resin modified bitumen emulsion of the instant invention has substantially greater skid, wear and scuff resistance than a coating prepared from said emulsion containing no sand. Likewise, coatings prepared from emulsions to which cork or vermiculite has been added have improved insulating properties, while the addition of mica affords a coating having improved weatherproofing characteristics.

The invention can be more fully understood by reference to the following examples. All parts are parts by weight unless otherwise expressly noted.

EXAMPLE 1

Coal tar (coke oven tar) of RT–12 grade with a softening point of 93–98° F. by the ASTM Ring and Ball Test is first separately heated to about 260° F. in a suitable vessel equipped with a stirrer. There was then added to the heated coal tar about 0.6% by weight of the coal tar of a fatty amine obtained commercially under the trademark designation Delamin P and comprising a mixture of amines derived from tall oil fatty acid and including stearyl, linoleyl and oleyl amines. The resulting mass was stirred for a short time to assure homogeneous solution. A clay slurry was also separately prepared by adding about 2.5 parts of bentonite clay, 28.2 parts of Dark Ball Clay (obtained from Bell Operations, Incorporated) and 3 parts by weight of inert material to 69 parts of water. The clay slurry was heated to a temperature of 95° C. by partly immersing the vessel containing the clay slurry in a boiling water bath. The coal tar fatty amine mixture at a temperature of 260° F. was then slowly added to the heated clay slurry with high speed shearing agitation at 2000 r.p.m.. over a period of about 5 minutes. The amount of coal tar and amine added to the clay slurry was such that the ratio by weight of tar and amine to clay slurry was 1 to 2. High speed shearing agitation at 2000 r.p.m. was continued for an additional 5 minutes to form an emulsion having desirably fine coal tar particle size. During admixture of the hot bitumen and slurry, water was vaporized and the loss was made up by the addition of hot water to maintain the predetermined water content. The final product had a bitumen plus filler solids content of about 53% by weight and was a thixotropic emulsion of excellent color having an initial viscosity of about 25,000 centipoises at room temperature, which was readily reduced by simple agitation to about 5,000 centipoises.

The tar-clay emulsion after cooling, was evaluated as to water absorption by coating it on to weighted copper panels using a doctor blade with an opening set at $\frac{1}{16}$ inch. Each coated panel was allowed to dry for 96 hours, was immersed in water briefly, withdrawn, the coated surface blotted and the panel weighed. Each panel was then immersed in distilled water for 15 days, withdrawn, and the coated surface again blotted and weighed. The amount of water absorbed was determined by the difference in weight before and after immersion and found to average a low 4.5% based on the weight of the dried coal tar-clay coating. The above test was conducted in accordance with the Military Specification for bituminous emulsion coating compounds, MIL–C–15203C (DOCKS) (Jan. 8, 1962) modified in that the test panel was of copper instead of aluminum.

EXAMPLE 2

A coal tar-clay emulsion was prepared similar to that of Example 1, except that the amount of Delamin P added to the coal tar was increased to 0.8% by weight of the coal tar. Evaluation of coatings formed from this emulsion showed a water absorption of only 3% by weight as determined in accordance with the Military Specification test as in Example 1.

EXAMPLE 3

A coal tar-clay emulsion was prepared similar to that of Example 1, except that the amount of the Delamin P added to the coal tar was increased to 1.0% by weight of the coal tar. Evaluation of coatings formed from this emulsion showed a water absorption of only 1.2% by weight as determined in accordance with the Military Specification test as in Example 1.

EXAMPLE 4

The conventional coal tar-clay emulsion was prepared similar to Example 1, except that no amine was added. The coatings formed by the emulsion prepared without amine showed a high water absorption of about 13.3% as determined in accordance with the Military Specification test as in Example 1.

EXAMPLE 5

Example 1 was repeated except that the water-insoluble amine employed was a mixture of amines derived from animal fat and obtainable commercially under the trademark "Armeen T." Evaluation of the coatings formed from the emulsion of this example in accordance with the Military Specification test showed a water absorption of only about 4.0% based on the weight of the coating.

EXAMPLE 6

Example 1 was repeated except that the water-insoluble amine employed was derived from pine rosin acid and contained dehydroabietyl amine. The amine employed is obtainable commercially under the trademark "Rosin Amine D." Evaluation of the coatings formed from the emulsions of this example in accordance with the Military Specification test shows a water absorption of only about 4.0% based on the weight of the coating.

EXAMPLE 7

RT-10 grade bitumen (softening point ca. 80° F.) was heated to 250° F., then 1.0 wt. percent of each of the amines listed below in Table I was added with stirring to aliquots of the heated coal tar. An aqueous slurry containing 40 wt. percent dark ball clay was prepared and heated to 200° F. The various bitumen plus amine mixtures were added to individual portions of the slurry with concomitant shearing agitation. Stirring was continued for 15 minutes after addition was complete. Sufficient bitumen plus amine was added to provide an emulsion having a water content of about 45 wt. percent in each case.

The respective amine plus bitumen plus clay emulsion products all had a final viscosity of about 8,000 centipoises. Each of these emulsions was cooled to room temperature and a sufficient amount of each of the emulsions was deposited on a series of copper strips to provide a coating after drying for 96 hours about $\frac{1}{16}$ inch thick. The dried coated panel was then immersed briefly in distilled water, blotted dry and weighed. Each panel was then re-immersed in distilled water for 15 days, removed, blotted dry and reweighed. The weight gain in all cases was less than 5% in comparison with a weight gain of 10% for an otherwise identical amine free bitumen emulsion coated sample.

TABLE 1

Lauryl amine
Eicosyl amine
Tricosyl amine
2-amino dodecane
4-amino hexadecane
2-amino tetradecane
12-amino dodecyl benzene
β-(12-aminododecyl)naphthalene
Di-dodecyl amine
Tri-myristylamine
N,N-dimethyl laurylamine
N,N-dioctyl cyclohexylamine
2-(5-aminopentylamino)dodecane
2-(β-aminoethylamino)hexadecane

I claim:
1. An aqueous emulsion comprising:
  (a) from 35 to 55 weight percent water;
  (b) mineral bitumen having a softening point ranging from about 80° F. to about 210° F.;
  (c) from about 0.3 to about 1.25 parts by weight of filler per part of said bitumen wherein at least about 40% by weight of said filler is active clay-type filler, wherein said clay is selected from the group consisting of kaolin clays, fire clays, montmorillonites, and mixtures thereof;
  (d) from 0.1 to 5.0 weight percent based on bitumen of water-insoluble amine having the structure:

$$(RR_1R_2C)_mNH_n$$

wherein $m$ is 1 to 3 and $n$ is 0 to 2, the sum of $m$ and $n$ being 3 and R, $R_1$ and $R_2$, which may be the same or different, are selected from the group consisting of hydrogen, aliphatic, alicyclic and aromatic hydrocarbon radicals and amino-substituted aliphatic alicyclic and aromatic hydrocarbon radicals and wherein R, $R_1$ and $R_2$ jointly contain from 7 to 40 carbon atoms.

2. An emulsion in accordance with claim 1 wherein said amine is a fatty amine having 10 to 26 carbon atoms and is present in an amount ranging from about 0.4 wt. percent to about 2.0 wt. percent based on bitumen.

3. An emulsion in accordance with claim 1 wherein said bitumen is a coal derived bitumen and has a softening point ranging from about 80° F. to about 110° F.

4. An emulsion in accordance with claim 1 wherein said filler is present in an amount ranging from about 0.5 parts to 1.0 parts by weight of filler per part of bitumen.

5. An emulsion in accordance with claim 4 wherein at least about 60% by weight of said filler is kaolin clay, fire clay, or a mixture thereof.

6. An emulsion in accordance with claim 1 wherein from about 1% to about 25% of said filler is bentonite type clay.

7. An emulsion in accordance with claim 1 containing from about 0.5% to about 15% by weight based on bitumen of a modifier resin selected from the group of resins consisting of natural rubber; ethylene and propylene polymers and copolymers; chlorinated rubber; chlorinated polyethylene and propylene polymers and copolymers; polychloroprene; polybutene; polyisobutylene; polystyrene; butadiene-styrene-acrylonitrile terpolymers; butadiene-acrylonitrile copolymers; and mixtures thereof, wherein said resin is added in latex form.

8. A coating formed by the deposition of the emulsion of claim 1 on a substrate and evaporation of substantially all of the water contained in said emulsion.

References Cited

UNITED STATES PATENTS

| | | | |
|---|---|---|---|
| 2,661,301 | 12/1953 | Capell | 106—281 |
| 2,730,454 | 1/1956 | Sommer et al. | |
| 2,894,848 | 7/1959 | Goodwin et al. | 106—278 |
| 3,383,229 | 5/1968 | Conort | 106—277 |
| 2,623,852 | 12/1952 | Peterson | 252—28 |

JULIUS FROME, Primary Examiner

J. B. EVANS, Assistant Examiner

U.S. Cl. X.R.

94—20; 106—14, 278, 283; 252—311.5; 260—28.5, 29.7, 745, 746